(12) United States Patent
Liu et al.

(10) Patent No.: US 11,527,762 B1
(45) Date of Patent: Dec. 13, 2022

(54) MEMBRANE ELECTRODE, FUEL CELL GAS DIFFUSION LAYER AND PROCESS FOR PREPARING THE FUEL CELL GAS DIFFUSION LAYER

(71) Applicant: Wuhan Hydrogen Energy and Fuel Cell Industry Technology Research Institute Co., Ltd., Wuhan (CN)

(72) Inventors: Qiang Liu, Wuhan (CN); Lingfeng Gao, Wuhan (CN); Tianshu Liao, Wuhan (CN); Jianan Wang, Wuhan (CN); Feng Cheng, Wuhan (CN)

(73) Assignee: WUHAN HYDROGEN ENERGY AND FUEL CELL INDUSTRY TECHNOLOGY RESEARCH INSTITUTE CO., LTD., Wuhan (CN)

( * ) Notice: Subject to any disclaimer, the term of this patent is extended or adjusted under 35 U.S.C. 154(b) by 0 days.

(21) Appl. No.: 17/728,953

(22) Filed: Apr. 25, 2022

(30) Foreign Application Priority Data

Jun. 11, 2021 (CN) .......................... 202110651725.7

(51) Int. Cl.
*H01M 4/88* (2006.01)
(52) U.S. Cl.
CPC ................................ *H01M 4/8807* (2013.01)
(58) Field of Classification Search
CPC .................................................. H01M 4/8807
See application file for complete search history.

(56) References Cited

FOREIGN PATENT DOCUMENTS

| CN | 102456891 A | | 5/2012 | |
|---|---|---|---|---|
| CN | 104852057 A | * | 8/2015 | |
| CN | 110518259 A | * | 11/2019 | |
| CN | 112421059 A | | 2/2021 | |
| CN | 112952114 A | * | 6/2021 | .......... H01M 4/8807 |

\* cited by examiner

Primary Examiner — Brian R Ohara
(74) Attorney, Agent, or Firm — WPAT, PC

(57) ABSTRACT

Disclosed is a membrane electrode, fuel cell gas diffusion layer, and process for preparing the fuel cell gas diffusion layer, the process comprising: S1 coating microporous layer slurry on the surface of hydrophobic carbon paper; the microporous layer slurry was obtained by dispersing mixture of carbon powder, polytetrafluoroethylene dispersion solution, thickener, and solvent; S2 moving the hydrophobic carbon paper coated with the microporous layer slurry to a porous ceramic plate, and connecting a vacuum pump to the porous ceramic plate, vacuumed for adsorption pre-infiltration treatment, and then dried. S3 continuing to coat the microporous layer slurry on the hydrophobic carbon paper dried in step S2, then drying, and then sintering at 250-400° C. to obtain a gas diffusion layer. The beneficial effects of this disclosure include: this disclosure improve the water vapor erosion resistance of the microporous layer and the durability of the gas diffusion layer.

6 Claims, 2 Drawing Sheets

MEMBRANE ELECTRODE, FUEL CELL GAS DIFFUSION LAYER AND PROCESS FOR PREPARING THE FUEL CELL GAS DIFFUSION LAYER

FIELD OF THE DISCLOSURE

The disclosure relates to the technical field of fuel cells, in particular to a membrane electrode, fuel cell gas diffusion layer, and process for preparing the fuel cell gas diffusion layer.

BACKGROUND

Proton exchange membrane fuel cell is an energy conversion device that can directly convert chemical energy in hydrogen fuel and oxidant into electrical energy through electrochemical reaction. Fuel cell has the characteristics of high energy conversion efficiency and no exhaust emissions, and is considered to be one of the most promising solutions to solve the energy crisis and environmental pollution, especially in transportation such as automobiles, ships, and standby power sources. Due to these outstanding advantages, the development and application of fuel cell technology have attracted much attention, and it is considered to be the preferred clean and efficient power generation method in the 21st century.

Gas diffusion layer (GDL) is one of the core materials of fuel cell membrane electrode, which plays an important role in supporting the catalytic layer, collecting current, conducting gas, and discharging reaction product water in fuel cells. The conductivity of the gas diffusion layer and the water vapor transmission efficiency inside the gas diffusion layer have a crucial impact on the performance of the fuel cell. The water vapor transmission efficiency inside the gas diffusion layer mainly depends on the pore structure of the gas diffusion layer, the pore distribution, and the interface construction between the microporous layer and the carbon paper layer.

Because the pore diameters of the microporous layer and the carbon paper layer are quite different, and the slurry of the microporous layer is not easy to form a good contact with the hydrophobic carbon paper, the Chinese patent CN201710879659.2 improves the interface contact between the microporous layer and the carbon paper layer by hot pressing treatment, but the hot-pressing treatment is easy to bring structural damage to the carbon paper and compress the water vapor transmission path to a certain extent, thus affecting the performance and durability of the gas diffusion layer.

SUMMARY

The purpose of this disclosure is to overcome the above technical deficiencies and provide a membrane electrode, fuel cell gas diffusion layer, and process for preparing the fuel cell gas diffusion layer, which can improve the durability of the gas diffusion layer on the premise of ensuring the performance of the gas diffusion layer.

To achieve the above technical purpose, this disclosure provides a membrane electrode, fuel cell gas diffusion layer, and process for preparing the fuel cell gas diffusion layer.

A process for preparing fuel cell gas diffusion layer, comprising the following steps:

S1 coating microporous layer slurry on the surface of hydrophobic carbon paper; the microporous layer slurry was obtained by dispersing mixture of carbon powder, polytetrafluoroethylene dispersion solution, thickener, and solvent;

S2 moving the hydrophobic carbon paper coated with the microporous layer slurry to a porous ceramic plate, and connecting a vacuum pump to the porous ceramic plate, vacuumed for adsorption pre-infiltration treatment, and then dried;

S3 continuing to coat the microporous layer slurry on the hydrophobic carbon paper dried in step S2, then drying, and then sintering at 250-400° C. to obtain a gas diffusion layer.

This disclosure also provides a fuel cell gas diffusion layer which is prepared by the above process.

In addition, this disclosure also provides a membrane electrode, comprising the above fuel cell gas diffusion layer, a CCM catalytic layer and a frame, the gas diffusion layer, the CCM catalytic layer, and the frame are sequentially attached.

The beneficial effects of this disclosure include: the hydrophobic carbon paper was pre-treated by vacuum infiltration before coating the microporous layer slurry, and the microporous layer slurry was infiltrated into the hydrophobic carbon paper layer by using the vacuum adsorption force to overcome the capillary pressure, and then part of the carbon powder was filled in the macropores on the surface of the hydrophobic carbon paper. The filling of the carbon powder for the macropores on the surface of the carbon paper can effectively reduce the pore size of the carbon paper surface and improve the surface smoothness of the carbon paper layer. At the same time, the pre-infiltrated hydrophilic carbon powder slurry can reduce the surface contact angle of the hydrophobic carbon paper. These changes brought about by the pre-infiltration treatment are beneficial to the subsequent coating of the microporous layer slurry and the carbon paper layer to form a good contact interface, increasing the contact area between the two. At the same time, the filling of carbon powder slurry for macropores on the surface of carbon paper can reduce the size of the pore on the carbon paper surface to a certain extent, thereby reducing the pore size difference between the carbon paper layer and the microporous layer, making the transition of the pore structure of the interface between the microporous layer and the carbon paper layer more stable, which is beneficial to optimize the internal water vapor transmission channel. Moreover, sintering at 250-400° C. can ensure the hydrophobicity of the gas diffusion layer surface. In addition, the increase of the contact area between the subsequently coated microporous layer and the carbon paper layer is beneficial to reduce the ohmic resistance, thereby improving the performance of the fuel cell. The increase of the contact area can also make the adhesion between the microporous layer and the hydrophobic carbon paper layer firmer, which is beneficial to improve the water vapor erosion resistance of the microporous layer and the durability of the gas diffusion layer.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

Figure 1:
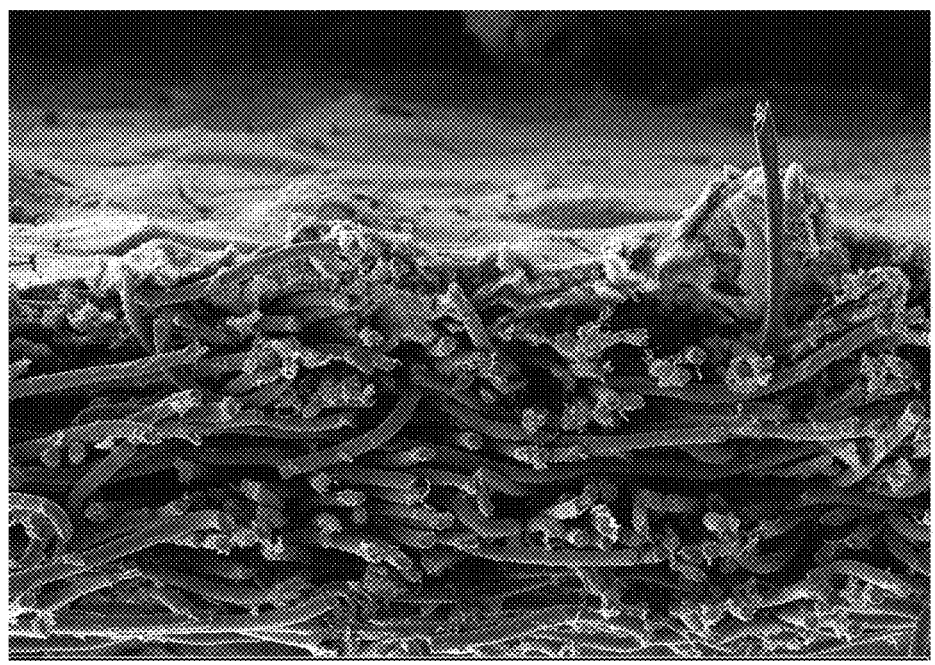
FIG. 1 is a scanning electron microscope image of a cross-section of the gas diffusion layer obtained in Embodiment 1 of this disclosure.

The embodiment provides a process for preparing a fuel cell gas diffusion layer, comprising the following steps:

S1 coating microporous layer slurry on the surface of hydrophobic carbon paper; the coating thickness of the microporous layer slurry is 10-100 μm; the microporous layer slurry was obtained by subjecting mixture of carbon powder, polytetrafluoroethylene dispersion solution (PTFE dispersion solution), thickener methylcellulose, and aqueous solution of solvent alcohol to planetary ball milling and dispersing for 0.5-10 h; the coating method is flat direct coating; in the aqueous solution of the alcohol, the mass fraction of the alcohol is 5%-20%, the alcohol is preferably ethanol, and in other embodiments, the alcohol may also be other alcohols such as methanol and isopropanol.

S2 moving the hydrophobic carbon paper coated with the microporous layer slurry to a porous ceramic plate, and connecting a vacuum pump to the porous ceramic plate, vacuumed for adsorption pre-infiltration treatment for 10-120 seconds, and then dried; wherein, the vacuum degree of the vacuum pump is below −50 kPa; by vacuuming, a certain degree of vacuum can be formed at the bottom of the carbon paper to make the slurry penetrate into the carbon paper;

S3 continuing to coat the microporous layer slurry on the hydrophobic carbon paper dried in step S2 wherein the coating thickness of the microporous layer slurry is 50-300 μm, then drying, and then sintering at 250-400° C. for 10-120 min to obtain a gas diffusion layer.

In the above embodiments, in the mixture, the mass fraction of the carbon powder is 3-15 wt %, the mass fraction of the polytetrafluoroethylene is 5-30 wt %, the mass fraction of the methylcellulose is 0.5-5 wt %, and the rest is solvent. The PTFE dispersion solution is composed of PTFE particles, water, and surfactant.

The embodiment also provides a fuel cell gas diffusion layer which is prepared by the above process.

In addition, this disclosure also provides a membrane electrode, comprising the above fuel cell gas diffusion layer, a CCM catalytic layer and a frame, the gas diffusion layer, the CCM catalytic layer, and the frame are sequentially attached.

In order to make the purpose, technical solutions, and advantages of this disclosure clearer, this disclosure will be described in further detail below in conjunction with the accompanying drawings and embodiments. It should be understood that the specific embodiments described herein are only used to explain this disclosure, but not to limit this disclosure.

Embodiment 1

Embodiment 1 provides a process for preparing a fuel cell gas diffusion layer, comprising the following steps:

S1 coating microporous layer slurry on the surface of hydrophobic carbon paper; the coating thickness of the microporous layer slurry is 10 μm; the microporous layer slurry was obtained by subjecting mixture of carbon powder, polytetrafluoroethylene dispersion solution, thickener methylcellulose, and aqueous solution of ethanol to planetary ball milling and dispersing for 5 h; the coating method is flat direct coating; in the mixture, the mass fraction of the carbon powder is 15 wt %, the mass fraction of the polytetrafluoroethylene is 25 wt %, the mass fraction of the methylcellulose is 1 wt %, and the rest is solvent; in the aqueous solution of ethanol, the mass fraction of the ethanol is 20%.

S2 moving the hydrophobic carbon paper coated with the microporous layer slurry to a porous ceramic plate, and connecting a vacuum pump to the porous ceramic plate, vacuumed for adsorption pre-infiltration treatment for 10 seconds, and then dried; wherein, the vacuum degree of the vacuum pump is −80 kPa;

S3 continuing to coat the microporous layer slurry on the hydrophobic carbon paper dried in step S2 wherein the coating thickness of the microporous layer slurry is 150 μm, then drying, and then sintering at 350° C. for 60 min to obtain a gas diffusion layer.

It can be seen from FIG. 1 that the microporous layer and the carbon paper layer are closely attached, and at the same time, it can be observed that the carbon powder particles penetrate into the carbon paper layer, forming a smooth transition area.

Embodiment 2

Embodiment 2 provides a process for preparing a fuel cell gas diffusion layer, comprising the following steps:

S1 coating microporous layer slurry on the surface of hydrophobic carbon paper; the coating thickness of the microporous layer slurry is 100 μm; the microporous layer slurry was obtained by subjecting mixture of carbon powder, polytetrafluoroethylene dispersion solution, thickener methylcellulose, and aqueous solution of ethanol to planetary ball milling and dispersing for 10 h; the coating method is flat direct coating; in the mixture, the mass fraction of the carbon powder is 10 wt %, the mass fraction of the polytetrafluoroethylene is 30 wt %, the mass fraction of the methylcellulose is 5 wt %, and the rest is solvent; in the aqueous solution of ethanol, the mass fraction of the ethanol is 20%.

S2 moving the hydrophobic carbon paper coated with the microporous layer slurry to a porous ceramic plate, and connecting a vacuum pump to the porous ceramic plate, vacuumed for adsorption pre-infiltration treatment for 120 seconds, and then dried; wherein, the vacuum degree of the vacuum pump is −80 kPa;

S3 continuing to coat the microporous layer slurry on the hydrophobic carbon paper dried in step S2 wherein the coating thickness of the microporous layer slurry is 150 μm, then drying, and then sintering at 350° C. for 60 min to obtain a gas diffusion layer.

Embodiment 3

Embodiment 3 provides a process for preparing a fuel cell gas diffusion layer, comprising the following steps:

S1 coating microporous layer slurry on the surface of hydrophobic carbon paper; the coating thickness of the microporous layer slurry is 50 μm; the microporous layer slurry was obtained by subjecting mixture of carbon powder, polytetrafluoroethylene dispersion solution, thickener methylcellulose, and aqueous solution of ethanol to planetary ball milling and dispersing for 0.5 h; the coating method is flat direct coating; in the mixture, the mass fraction of the carbon powder is 3 wt %, the mass fraction of the polytetrafluoroethylene is 5 wt %, the mass fraction of the methylcellulose is 2 wt %, and the rest is solvent; in the aqueous solution of ethanol, the mass fraction of the ethanol is 5%.

S2 moving the hydrophobic carbon paper coated with the microporous layer slurry to a porous ceramic plate, and connecting a vacuum pump to the porous ceramic plate, vacuumed for adsorption pre-infiltration treatment for 60 seconds, and then dried; wherein, the vacuum degree of the vacuum pump is −60 kPa;

S3 continuing to coat the microporous layer slurry on the hydrophobic carbon paper dried in step S2 wherein the coating thickness of the microporous layer slurry is 300 μm, then drying, and then sintering at 400° C. for 10 min to obtain a gas diffusion layer.

Embodiment 4

Embodiment 4 provides a process for preparing a fuel cell gas diffusion layer, comprising the following steps:

S1 coating microporous layer slurry on the surface of hydrophobic carbon paper; the coating thickness of the microporous layer slurry is 40 μm; the microporous layer slurry was obtained by subjecting mixture of carbon powder, polytetrafluoroethylene dispersion solution, thickener methylcellulose, and aqueous solution of ethanol to low-temperature planetary ball milling and dispersing for 5 h; the coating method is flat direct coating; in the mixture, the mass fraction of the carbon powder is 10 wt %, the mass fraction of the polytetrafluoroethylene is 20 wt %, the mass fraction of the methylcellulose is 1.5 wt %, and the rest is solvent; in the aqueous solution of ethanol, the mass fraction of the ethanol is 15%.

S2 moving the hydrophobic carbon paper coated with the microporous layer slurry to a porous ceramic plate, and connecting a vacuum pump to the porous ceramic plate, vacuumed for adsorption pre-infiltration treatment for 20 seconds, and then dried; wherein, the vacuum degree of the vacuum pump is −70 kPa;

S3 continuing to coat the microporous layer slurry on the hydrophobic carbon paper dried in step S2 wherein the coating thickness of the microporous layer slurry is 200 μm, then drying, and then sintering at 250° C. for 120 min to obtain a gas diffusion layer.

Embodiment 5

Embodiment 5 provides a process for preparing a fuel cell gas diffusion layer, comprising the following steps:

S1 coating microporous layer slurry on the surface of hydrophobic carbon paper; the coating thickness of the microporous layer slurry is 70 μm; the microporous layer slurry was obtained by subjecting mixture of carbon powder, polytetrafluoroethylene dispersion solution, thickener methylcellulose, and aqueous solution of ethanol to low-temperature planetary ball milling and dispersing for 5 h; the coating method is flat direct coating; in the mixture, the mass fraction of the carbon powder is 3 wt %, the mass fraction of the polytetrafluoroethylene is 15 wt %, the mass fraction of the methylcellulose is 3 wt %, and the rest is solvent; in the aqueous solution of ethanol, the mass fraction of the ethanol is 15%.

S2 moving the hydrophobic carbon paper coated with the microporous layer slurry to a porous ceramic plate, and connecting a vacuum pump to the porous ceramic plate, vacuumed for adsorption pre-infiltration treatment for 20 seconds, and then dried; wherein, the vacuum degree of the vacuum pump is −60 kPa;

S3 continuing to coat the microporous layer slurry on the hydrophobic carbon paper dried in step S2 wherein the coating thickness of the microporous layer slurry is 80 μm, then drying, and then sintering at 300° C. for 100 min to obtain a gas diffusion layer.

The adhesion between the microporous layer of the fuel cell gas diffusion layer and the hydrophobic carbon paper layer prepared in this embodiment is firmer and has better durability.

Comparative Embodiment 1

A process for preparing a fuel cell gas diffusion layer, comprising the following steps:

directly coating a layer of microporous layer slurry with a wet thickness of 150 μm on a hydrophobic carbon paper, after drying, transferring it to a high-temperature oven and sintered at a high temperature of 350° C. for 60 min to obtain a gas diffusion layer.

Application Embodiment

Preparing membrane electrodes by sequentially laminating the gas diffusion layers prepared in Embodiments 1-2 and Comparative Embodiment 1 with a CCM catalytic layer and a frame.

Figure 2:
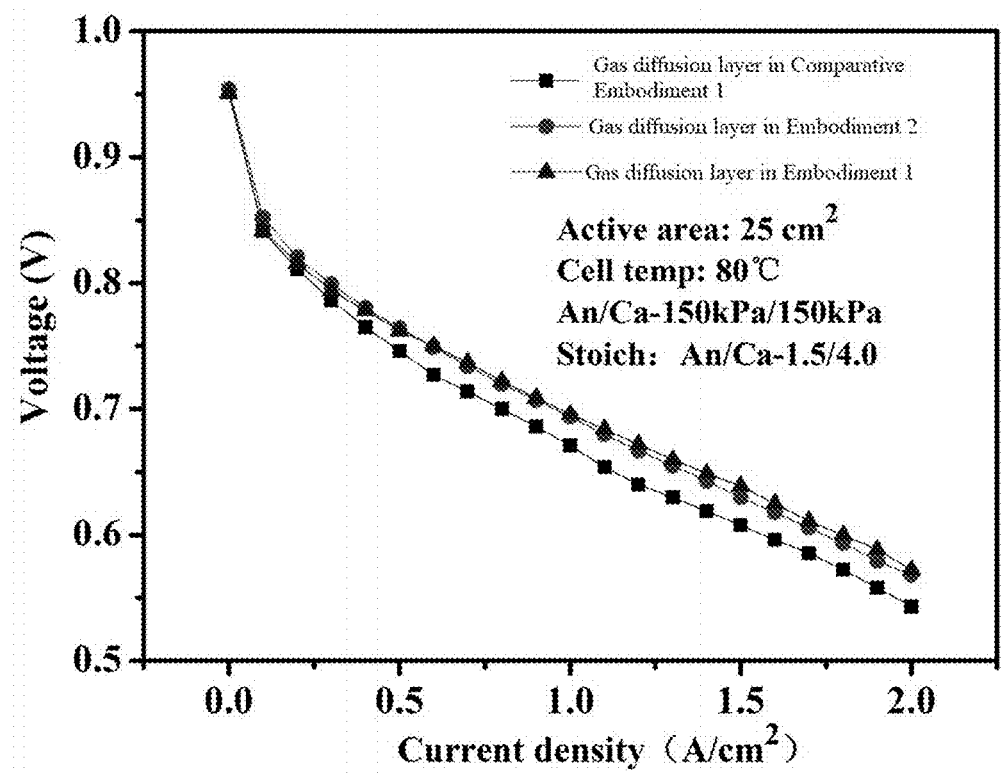
FIG. 2 is a graph showing the battery performance test results of membrane electrodes prepared in Embodiment 1, Embodiment 2, and Comparative Embodiment 1 of this disclosure.

In FIG. 2, the abscissa in the figure is the current density during battery testing, and the ordinate is the voltage value output by the membrane electrode under the corresponding current density. The higher the output voltage value, the better the power generation performance of the surface membrane electrode. In the case of the same catalytic layer (CCM), the higher the voltage, the better the conductivity of the gas diffusion layer and the better the performance of drainage and intake. It can be seen from FIG. 2 that the performance of the membrane electrode made of the gas diffusion layer of Embodiment 1-2 is better than that of the membrane electrode made of the gas diffusion layer of Comparative Embodiment 1. It can be seen that the performance of the gas diffusion layer can be improved by the pre-infiltration treatment of the carbon powder slurry, and it can be demonstrated that the treatment method improves the water vapor transmission channel inside the gas diffusion layer with reference to FIG. 1.

In addition, the changes of the key parameters of the gas diffusion layers of the Embodiment 1 and the Comparative Embodiment 1 before and after oxidative corrosion in the membrane electrode are compared, and the results are shown in Table 1.

TABLE 1

Changes of relevant parameters of the gas diffusion layers of Embodiment 1 and Comparative Embodiment 1

| | Thickness (μm) | Contact angle (°) | Vertical direction resistivity (mΩ · cm) | Average pore size (μm) |
|---|---|---|---|---|
| Gas diffusion layer in Embodiment 1 | 233 | 155 | 44 | 1.47 |
| After 3000 cycles of gas diffusion layer corrosion in Embodiment 1 | 232 | 151 | 55 | 1.56 |
| Gas diffusion layer in Comparative Embodiment 1 | 231 | 156 | 65 | 2.12 |
| After 3000 cycles of gas diffusion | 229 | 132 | 345 | 2.76 |

TABLE 1-continued

Changes of relevant parameters of the gas diffusion layers of Embodiment 1 and Comparative Embodiment 1

| | Thickness (μm) | Contact angle (°) | Vertical direction resistivity (mΩ · cm) | Average pore size (μm) |
|---|---|---|---|---|
| layer corrosion in Comparative Embodiment 1 | | | | |

It can be seen from Table 1 that the conductivity of the gas diffusion layer in Embodiment 1 with carbon powder pre-infiltration treatment is better than that of the Comparative Embodiment 1 without carbon powder pre-infiltration treatment, indicating that the pre-infiltration treatment improves the interface contact between the microporous layer and the carbon paper, and improves the conductivity. It is worth noting that the average pore size of the gas diffusion layer in Embodiment 1 is smaller than that of the gas diffusion layer in Comparative Embodiment 1, which is because the pre-infiltration of the slurry fills the macropores of some carbon paper layers, resulting in a decrease in the overall average pore size. From the change results of key characteristic parameters after corrosion test, the hydrophobicity, conductivity, and average pore size of the gas diffusion layer in Embodiment 1 have almost no change after 3000 times of corrosion. However, the hydrophobicity of the proportional carbon paper without carbon powder pre-infiltration treatment decreases significantly after 3000 times of corrosion, and the resistance increases sharply. At the same time, the average pore size also increases significantly. This is because the carbon powder of the carbon paper in Comparative Embodiment 1 falls off during the corrosion process, resulting in the loss of PTFE particles adhered to the carbon powder, resulting in the decrease of hydrophobicity, the increase of resistance, and the increase of pore size. The above results show that the pre-infiltration treatment can effectively enhance the adhesion between the microporous layer and the carbon paper layer, so that the carbon powder in the microporous layer is not easy to fall off during the corrosion and water vapor erosion, so that its hydrophobicity, conductivity, and pore structure can be stable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A process for preparing a fuel cell gas diffusion layer, comprising the following steps:

S1 coating microporous layer slurry on a surface of hydrophobic carbon paper; wherein the microporous layer slurry is obtained by dispersing a mixture of carbon powder, a polytetrafluoroethylene dispersion solution, a thickener, and a solvent; the thickener is methylcellulose; in the mixture, a mass fraction of the carbon powder is 3-15 wt %, a mass fraction of the polytetrafluoroethylene is 5-30 wt %, and a mass fraction of the methylcellulose is 0.5-5 wt %;

S2 moving the hydrophobic carbon paper coated with the microporous layer slurry to a porous ceramic plate, and connecting a vacuum pump to the porous ceramic plate, vacuumed for adsorption pre-infiltration treatment, and then dried; wherein a vacuum degree of the vacuum pump is below −50 kilopascals (kPa); a number of times of the adsorption pre-infiltration treatment is once, and the microporous layer slurry is infiltrated into the hydrophobic carbon paper layer by using a vacuum adsorption force to overcome capillary pressure, and then part of the carbon powder is filled in macropores on the surface of the hydrophobic carbon paper, filling of the carbon powder for the macropores on the surface of the carbon paper is to effectively reduce a pore size of the surface of the carbon paper and improve a surface smoothness of the carbon paper layer, and at the same time pre-infiltrated hydrophilic carbon powder contained slurry is to reduce a surface contact angle of the hydrophobic carbon paper; and S3 continuing to coat the microporous layer slurry on the hydrophobic carbon paper dried in step S2, then drying, and then sintering at 250-400° C. to obtain the gas diffusion layer;

wherein, in step S1, a coating thickness of the microporous layer slurry is 10-100 micrometers (μm); in the S2, time for the adsorption pre-infiltration treatment is 10-120 seconds.

2. The process for preparing the fuel cell gas diffusion layer according to claim 1, wherein in step S3, a coating thickness of the microporous layer slurry is 50-300 μm.

3. The process for preparing the fuel cell gas diffusion layer according to claim 1, wherein in step S3, the sintering time is 10-120 minutes (min).

4. The process for preparing the fuel cell gas diffusion layer according to claim 1, wherein in step S1, the solvent is an alcohol aqueous solution.

5. A fuel cell gas diffusion layer which is prepared by the process according to claim 1.

6. A membrane electrode, comprising the fuel cell gas diffusion layer according to claim 5, a catalyst-coated membrane (CCM) catalytic layer and a frame, wherein the gas diffusion layer, the CCM catalytic layer, and the frame are sequentially attached.

* * * * *